(12) United States Patent
Handing et al.

(10) Patent No.: US 8,544,905 B2
(45) Date of Patent: Oct. 1, 2013

(54) EXTENDIBLE STRUCTURAL PART FOR A MOTOR VEHICLE

(75) Inventors: Christian Handing, Langenberg (DE); Kegham Arzoumanian, Paderborn (DE); Andreas Hitz, Erwitte (DE); Otto Buschsieweke, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 35 days.

(21) Appl. No.: 13/091,723

(22) Filed: Apr. 21, 2011

(65) Prior Publication Data
US 2012/0098280 A1 Apr. 26, 2012

(30) Foreign Application Priority Data
Apr. 21, 2010 (DE) .......................... 10 2010 017 885

(51) Int. Cl.
*B60R 19/40* (2006.01)
*B60R 19/38* (2006.01)

(52) U.S. Cl.
USPC ............ 293/118; 293/119; 293/132; 293/135

(58) Field of Classification Search
USPC ................. 293/118, 120, 155, 102, 132, 133, 293/151, 119, 135; 29/897.2
See application file for complete search history.

(56) References Cited

U.S. PATENT DOCUMENTS

| 3,834,483 | A | * | 9/1974 | Palmer .......................... 180/271 |
| 5,941,582 | A | * | 8/1999 | Tan .............................. 293/132 |
| 6,050,624 | A | * | 4/2000 | Kim .............................. 293/132 |
| 6,174,008 | B1 | | 1/2001 | Kramer et al. |
| 7,299,630 | B2 | * | 11/2007 | Browne et al. ................. 60/527 |
| 7,344,005 | B2 | * | 3/2008 | Meernik ......................... 188/67 |

FOREIGN PATENT DOCUMENTS

| DE | 299 10 123 U1 | 9/1999 |
| DE | 198 47 385 C1 | 4/2000 |
| DE | 103 45 749 A1 | 4/2005 |
| DE | 102007057051 | 5/2009 |
| DE | 102008060716 | 6/2010 |

* cited by examiner

*Primary Examiner* — Glenn Dayoan
*Assistant Examiner* — Sunsurraye Westbrook
(74) *Attorney, Agent, or Firm* — Henry M. Feiereisen LLC

(57) ABSTRACT

A structural part for a motor vehicle includes an inner component having a generally rectangular cross section and configured in the form of a multichamber hollow section made of light metal, and an outer component having a generally rectangular cross section. The inner and outer components are movable in a telescoping manner relative to one another between an idle state and an activated state. A first locking mechanism is provided to lock the idle state and a second locking mechanism is provided to lock the activated state. The movement of the inner and outer components from the idle state to the activated state is hereby realized by an actuator.

18 Claims, 6 Drawing Sheets

EXTENDIBLE STRUCTURAL PART FOR A MOTOR VEHICLE

CROSS-REFERENCES TO RELATED APPLICATIONS

This application claims the priority of German Patent Application, Serial No. 10 2010 017 885.3-21, filed Apr. 21, 2010, pursuant to 35 U.S.C. 119(a)-(d), the content of which is incorporated herein by reference in its entirety as if fully set forth herein.

BACKGROUND OF THE INVENTION

The present invention relates to a structural part for a motor vehicle.

The following discussion of related art is provided to assist the reader in understanding the advantages of the invention, and is not to be construed as an admission that this related art is prior art to this invention.

Motor vehicles typically include a bumper across their front and rear for protection in the event of an impact but also for protection of a pedestrian in the event of a collision. Conventional bumpers have an impact fascia which extends transversely across the vehicle and slightly projects beyond the vehicle body. The impact fascia is hereby connected to a crossbeam placed behind the impact fascia. The bumper and the crossbeam absorb kinetic energy in the event of a collision and convert the kinetic energy into deformation energy. In the event of an impact at low speed, elastic parts of the bumpers are generally deformed by and large to prevent significant damage to the vehicle. For example, the bumper system can have a particular protection space in the event of a collision with a pedestrian.

In the event of an impact at greater speed, more impact energy has to be absorbed and dissipated in the form of deformation energy. For that purpose, bumper systems have been developed with crash boxes which are intended in particular to convert impact energy into deformation energy.

Bumper systems continuously undergo optimization by vehicle manufacturers or as a result of regulations in order to meet higher standards.

In order to reduce $CO_2$ emission and minimize fuel consumption, motor vehicles should be constructed lightweight and with an outer shape which enhances flow dynamics. These demands oftentimes go against the need to increase crash safety, when exposed to soft or also hard impacts in the event of an accident at low or high speed. Also as the overall space is tight because of the installation of other vehicle components such as charge-air coolers, the design of a motor vehicle requires consideration of crash elements as well as other vehicle components.

It would therefore be desirable and advantageous to provide an improved structural part for a motor vehicle to obviate prior art shortcomings and to allow significant transformation of impact energy into deformation energy while yet requiring little space.

SUMMARY OF THE INVENTION

According to one aspect of the present invention, a structural part for a motor vehicle includes an inner component having a generally rectangular cross section and configured in the form of a multichamber hollow section made of light metal, an outer component having a generally rectangular cross section, said inner and outer components movable in a telescoping manner relative to one another between an idle state and an activated state, a first locking mechanism for locking the idle state, a second locking mechanism for locking the activated state, and an actuator adapted to move the inner and outer components from the idle state to the activated state.

A structural part according to the present invention is especially useful for manufacturing a crash box because the safety aspect in the event of a crash is maintained while the need for installation space is reduced as the same distance is made available in order to dissipate impact energy into deformation energy, even though the dimensions are smaller, when the structural part assumes the idle state. As a result of the increase in dimension in the event of a crash, the crash safety is enhanced. As the structural part moves out telescopically in the activated state, the available distance for absorbing impact energy and converting the impact energy into deformation energy is extended.

According to another advantageous feature of the present invention, the first locking mechanism may include a locking lug which can be welded to the inner component. In this way, there is no weakening of the inner component as would be the case when the locking lug is formed by punching or projects outwards. The locking lug engages a yielding locking element which may be arranged on the outer component or a flange plate provided to receive the outer component.

According to another advantageous feature of the present invention, the actuator may be realized in the form of a mechanical, pyrotechnical, electromechanical, pneumatic and/or hydraulic actuating element. This is beneficial because the actuator actively causes the relative movement. The actuator introduces energy into the structural part in order to, for example, telescope the inner component out of the outer component so that for example in the event of a front bumper system a front crossbeam mounted to the inner component is displaced forwards in travel direction. The bumper may hereby be displaced forwards with the crossbeam or it may also be conceivable that only the crossbeam is shifted forwards. The extension of the structural part through activation of the actuator is instantly. This is necessary in the event of an impact caused by an accident in order to increase the energy absorption capability in the event of a crash.

According to another advantageous feature of the present invention, the actuator may be constructed as a spring. Currently preferred is the implementation as a helical spring. The use of a spring as mechanical actuator is beneficial because it can be installed inexpensively and reliably into the structural part for a motor vehicle. Also, a spring is less prone to malfunction and thus useful for the longevity of the bumper system. The bumper system can be manufactured cost-efficiently and is highly reliable in operation. In the idle state, the spring is maintained under tension and is released when the structural part is activated so as to move the inner and outer components relative to one another and for structural part to assume the activated state. The activated state is also locked to establish the extended path for absorption of crash energy.

According to another advantageous feature of the present invention, the actuator may include a recognition sensor system to activate the first locking mechanism and thereby release the locked idle state in the event of an imminent crash. In addition, the second locking mechanism for locking the activated state may be operably connected to a recognition sensor system which activates the second locking mechanism. It is hereby possible to use an already existing recognition sensor system in the motor vehicle for detection of a potential accident. This type of recognition sensor system is oftentimes provided in motor vehicles as early crash warning sensor system which can be utilized to activate the structural part for absorption of crash energy.

The locking of the idle state may be realized by a predetermined breaking point. In the event of a crash, this predetermined breaking point would rupture and trigger activation, i.e. telescoping movement between the inner and outer components to assume the activated state. The predetermined breaking point can then be used as information that the system has been activated. This indicates that the system has to be replaced and cannot be simply moved back after an accident and ensuing release or after an inadvertent release as this could cause malfunction of the system. Detection of the activated system resembles the operation of an airbag which when deployed can be recognized by predetermined breaking points in the dashboard and the deployed airbag.

As an alternative, it is, of course, also conceivable to provide a separate recognition sensor system. The recognition sensor system is capable to detect an accident even before it actually happens and outputs respective control signals to operate the first locking mechanism in the idle state and release it. The first locking mechanism may hereby be released by a built-in actuator which may be realized in the form of a mechanical, pyrotechnical, electromechanical, pneumatic and/or hydraulic actuating element.

According to another advantageous feature of the present invention, the actuator may be rendered activated by a recognition sensor system. When the actuator operates purely mechanically, it is rendered activated as soon as the idle state is released. When pyrotechnical, electromechanical, pneumatic and/or hydraulic actuators or combinations thereof are involved, release requires also activation of the actuator, for example by using control signals generated by an existing recognition sensor system or by a recognition sensor system installed in particular for the crash energy absorption system.

According to another advantageous feature of the present invention, the second locking mechanism includes a detent nose and an abutment associated to the detent nose to lock the activated state. This has the advantage that the activated state can be locked in a purely mechanical way and thus is easy and reliably to manufacture while at the same time is less prone to malfunction so that a locking of the activated state is attained reliably to meet the requirements.

The detent nose may not only operate mechanically, for example through use of a spring mechanism or by maintaining the detent nose under tension, but may be caused to engage through active displacement for example. The active displacement may be realized for example in the form of an electromechanically operated actuator. The use of pyrotechnical, pneumatic and/or hydraulic actuating elements is, of course, also conceivable in order to lock the activated state.

According to another advantageous feature of the present invention, the detent nose of the second locking mechanism may be arranged on an outer side of the outer component for engagement in an oblong hole formed in the inner component. The inner component with attached crossbeam may hereby move out of the outer component. The outer component is securely fixed to the vehicle body. When the inner component has fully moved out, the locking lug engages the complementary oblong hole.

It is, however, also conceivable to telescope the inner component out of the outer component up to an end stop and then to have it move back in the event of an impact up to a certain point in the outer component. The locking lug engages then only after the inner component has moved back into the outer component. This enables for example an elastic spring path of few centimeters to satisfy regulations involving pedestrian protection in the event of a crash. Retraction of the inner component is followed by locking to establish a rigid connection and to enable the outer and inner components to absorb as crash box energy in the form of deformation energy.

According to another advantageous feature of the present invention, the second locking mechanism may include a circumferential groove formed on the outer component and a bulge formed on the inner component for engagement in the circumferential groove. The circumferential groove may also be configured as embossment. The bulge of the inner component may be realized by an outer circumferential embossment or by a widened end of the inner component on the inner component.

As the inner component telescopes out of the outer component, the bulge of the inner component engages in the circumferential groove of the outer component. This results in a formfitting rigid connection between inner and outer components so that the entire deformation path is prolonged in a rigid manner.

According to another advantageous feature of the present invention, a guide can be arranged between the inner and outer components. Examples of a guide include rollers and/or balls which reduce friction between the inner and outer components and ensure a precise guidance of the telescoping relative movement. The guide may also be configured in the form of spacers which are provided either as external parts and/or as embossments or grooves on the inner component and/or outer component so that a flat engagement between inner and outer components is established. The guide provides tolerance compensation between inner and outer components and permits the implementation of a telescoping movement substantially in the absence of a sliding friction. This promotes the service life of a motor vehicle because it is ensured that the inner and outer components do not seize as a result of corrosion for example, and also ensures that the telescoping relative movement is carried out flawlessly and reliably at any time.

According to another advantageous feature of the present invention, the inner component and/or the outer component may be made of light metal or light metal alloy. Currently preferred is aluminum alloy. Aluminum alloy exhibits superior crash energy absorption capability while having little weight. A further benefit of aluminum alloy is the possibility to produce a complex cross sectional geometry of the inner component and/or outer component in a cost-efficient manner and with dimensional precision. Of course, it is certainly conceivable to manufacture the inner and outer components of different materials. For example, the inner component may be made of a light metal alloy, whereas the outer component may be made of a composite or a steel material. Currently preferred is the use of aluminum alloy as material for the inner and outer components, when the structural part is used as a crash box. The crossbeam may then be made of light metal or steel material.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
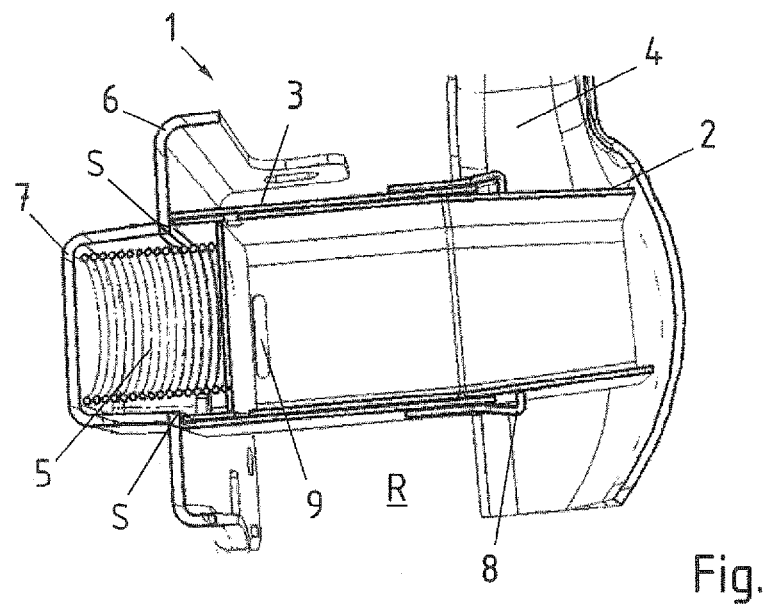
FIG. 1 is a sectional view of a structural part for a motor vehicle in accordance with the present invention for use as crash box, depicting the crash box in a locked idle state.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a structural part for a motor vehicle in accordance with the present invention for use as crash box, generally designated by reference numeral 1. The crash box 1 includes an inner component 2 and an outer component 3. The inner component 2 nests within the outer component 3. The crash box 1 is shown in FIG. 1 in an idle state R. Arranged on the left-hand-side of the outer component 3 in the drawing plane is a spring 5 which is maintained under tension in the idle state R. The outer component 3 is arranged on a flange plate 6 which is mounted to a not shown motor vehicle. The flange plate 6 has a spring pocket 7 for providing an abutment for the spring 5.

As shown in FIG. 1 by way of example, the locking of the idle state R is realized by a first locking mechanism which is includes predetermined breaking points S. In the event of a crash, the predetermined breaking points S rupture and trigger activation, i.e. telescoping movement between the inner and outer components 2, 3 to assume the activated state A. Reference sign "B" indicates the positions of the predetermined breaking points S after the activation.

Figure 2:
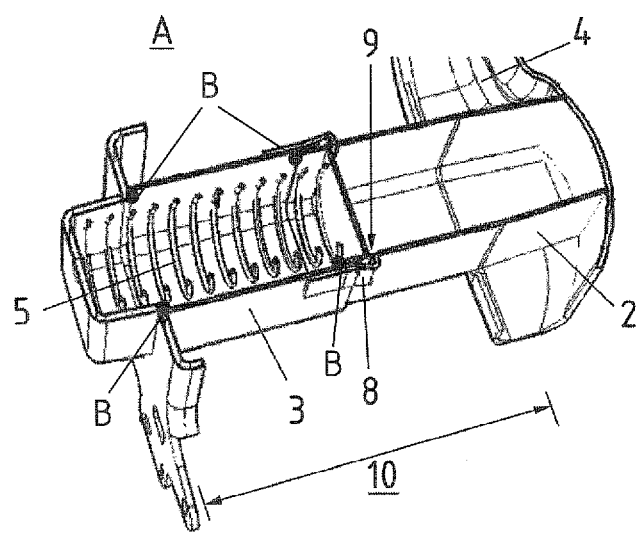
FIG. 2 is a sectional view of the crash box in the locked activated state.

The embodiment shown in FIG. 1 also includes a second locking mechanism formed by locking members for locking an activated state of the crash box 1. The locking members in FIG. 1 are formed by detent noses 8 and oblong holes 9. The detent noses 8 are engageable in the oblong holes 9 during and/or at and/or after activation of the crash box 1. The oblong holes 9 are arranged in the inner component 2. FIG. 2 shows the crash box 1 in the activated state A. In the activated state, the crash box 1 has been released so that the spring 5 is able to relax from the idle state R to thereby telescopically move the inner component 2 in relation to the outer component 3. The detent noses 8 of the outer component 3 snap into the oblong holes 9 of the inner component 2 so as to establish a formfitting overall system which is stiff in thrust direction. The path or distance 10 traveled by the inner component 2 is thereby substantially doubled in this non-limiting example and available for energy absorption.

Figure 3:
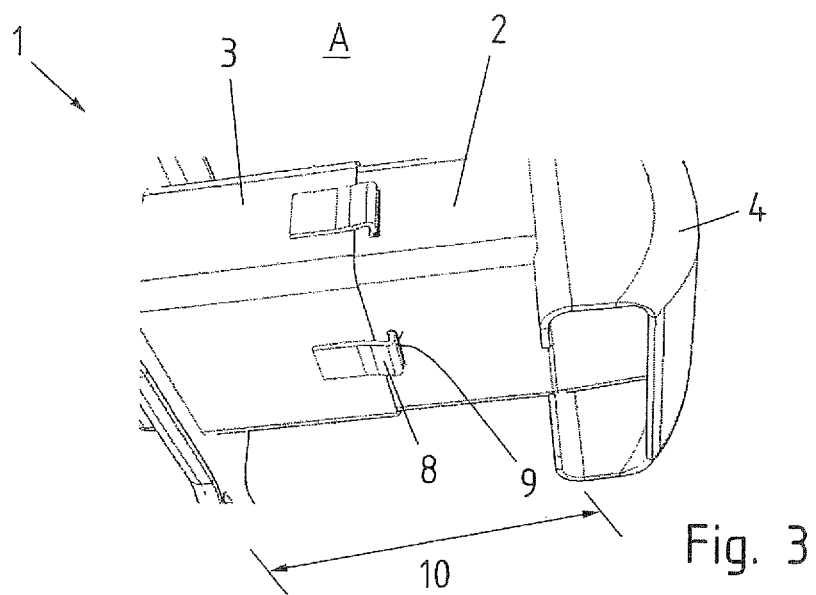
FIG. 3 is an enlarged detailed perspective view of the locked activated state of the crash box of FIG. 1.

FIG. 3 is an enlarged detailed perspective view of the locked activated state A of the crash box 1. The detent noses 8 of the outer component 3 engage the oblong holes 9 of the inner component 2 thereby extending the path 10 for crash energy absorption. As an alternative to the oblong holes 9, abutments such as weld-on necks may be provided to prevent a weakening of the inner component 2 as a result of perforating the inner component 2 to form the oblong holes. The inner and outer components 2, 3 have an essentially rectangular cross section, although round, elliptic, trapezoidal, star-shaped and/or combinations thereof are of course also conceivable.

Figure 4:
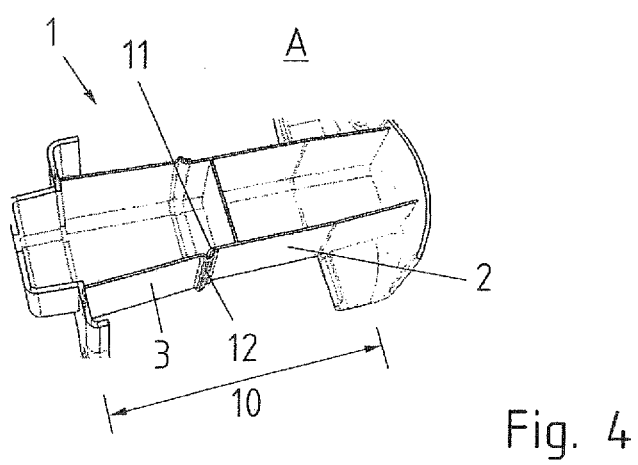
FIG. 4 is a perspective sectional view of another embodiment of a crash box in the locked activated state.

FIG. 4 is a perspective sectional view of another embodiment of a crash box 1 in the locked activated state A. Parts corresponding with those in FIG. 1 are denoted by identical reference numerals and not explained again. The description below will center on the differences between the embodiments. In this embodiment, the locking members of the second locking mechanism are respectively formed by a bulge 11 formed on and end of the inner component 2 and a circumferential embossment 12 of the outer component 3. Engagement of the bulge in the embossment results in a formfitting locking which is stiff in thrust direction, when the crash box 1 assumes the activated state A, to thereby establish a prolongation of the path 10 for crash energy absorption.

Figure 5:
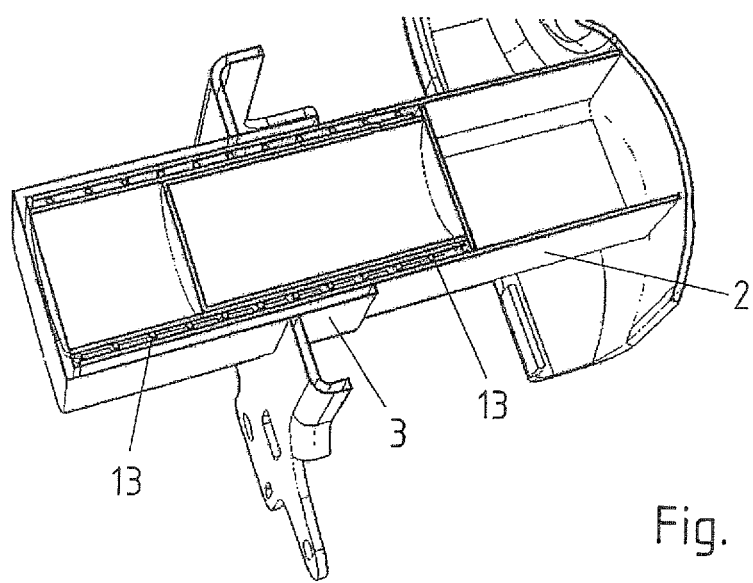
FIG. 5 is a perspective sectional view of a modified crash box with a guide.

FIG. 5 shows a sectional view of a crash box 1 which includes a guide 13 in the form of rollers between the inner component 2 and the outer component 3. The presence of rollers reduces friction between the inner component 2 and the outer component 3 to ensure a telescoping movement at any time.

Figure 6A:
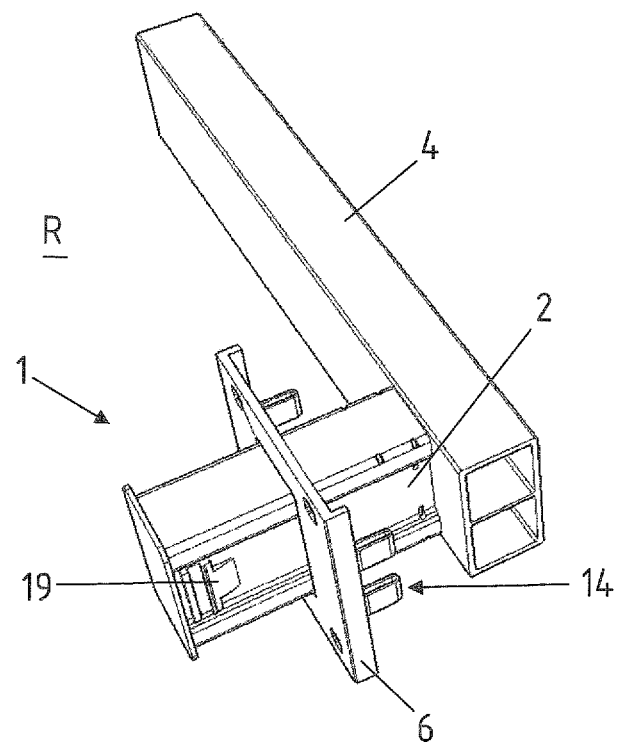
FIG. 6a is a perspective view of another embodiment of a structural part for a motor vehicle in accordance with the present invention for use as crash box.
Figure 6B:
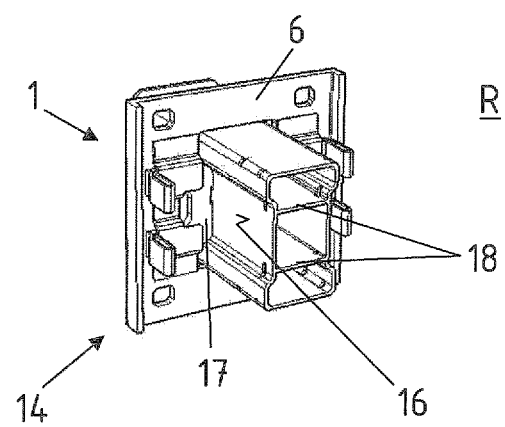
FIG. 6b is a detailed perspective front view of an inner component of the structural part with attached flange plate.

FIG. 6a is a perspective view of another embodiment of a crash box 1 in accordance with the present invention. Parts corresponding with those in FIG. 1 are denoted by identical reference numerals and not explained again. The description below will center on the differences between the embodiments. In this embodiment, the inner component 2 has a multichamber profile, shown in FIG. 6, and thus can be made from a multichamber hollow section of aluminum to improve a guidance of the inner and outer components 2, 3 while effecting a substantially even energy absorption over the entire length of the crash box 1 when moved out to assume the activated state A. The hollow multichamber inner component 2 has inner webs 18 of a thickness in the range between 1 and 3 mm. As a result, the hollow multichamber inner component 2 of aluminum allows easier variation of the wall thickness as compared to an inner component of steel.

The inner component 2 and the outer component 3 (not shown in FIG. 6a) have a substantially rectangular cross section. This configuration has the advantage that the inner and outer components 2, 3 can be made from extruded sections. As shown in FIG. 6a, the second locking mechanism is formed by a locking lug 19 and a locking device 14. The locking lug 19 is welded onto the inner component 2 and snaps in the locking device 14, when the crash box 1 assumes the activated state A. The locking device 14 is mounted to the locking-lug-distal side of the flange plate 6 and includes a plate-like locking element 17 which is shown in greater detail in FIG. 6b and is resiliently received in an embossment 16 of the inner component 2. The locking element 17 has hereby a configuration which conforms to a cross section of the embossment 16 of the inner component 2. In the activated state, the locking lug 19 slides underneath the locking element 17 to lock the activated state.

A welding of the locking lug 19 onto the inner component 2 is currently preferred because it does not weaken the inner component 2, as would be the case if holes or recesses or the like were to be provided.

Figure 8:
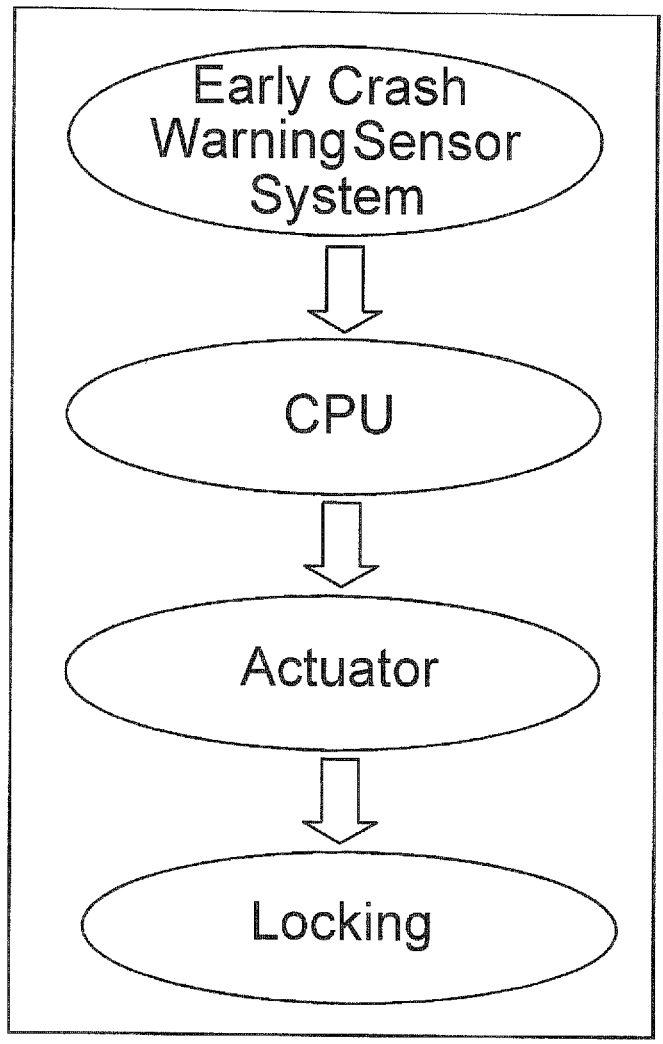
FIG. 8 is a block diagram showing the relationship and operation of the components of a locking mechanism.

As shown in FIG. 8, the locking of the activated state is operably linked with a recognition sensor system which operates like an early crash warning sensor system to detect the imminent occurrence of an accident. The crash warning sensor system causes a release of the first locking mechanism before the actual collision takes place to thereby extend the crash box 1 by the telescoping movement between the inner and outer components and cause the locking of the activated state.

Figure 7A:
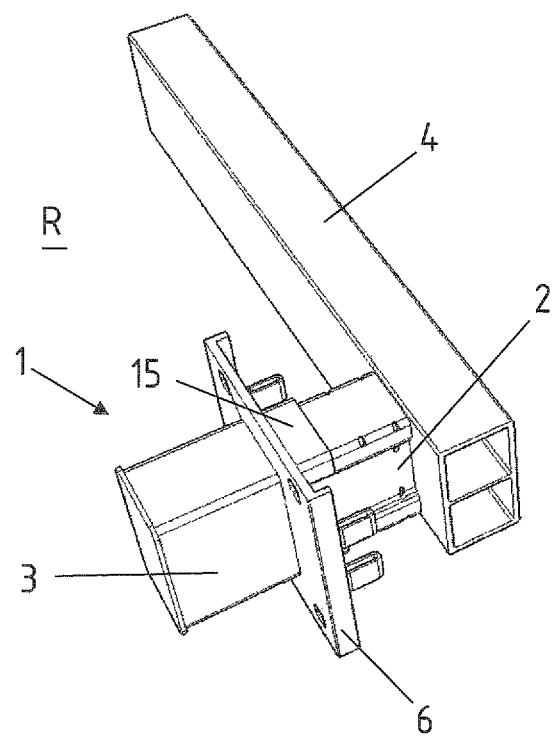
FIG. 7a is a perspective view of yet another embodiment of a structural part for a motor vehicle in accordance with the present invention for use as crash box.

FIG. 7a is a perspective view of yet another embodiment of a crash box 1 in accordance with the present invention. Parts corresponding with those in FIG. 6a are denoted by identical reference numerals and not explained again. The description below will center on the differences between the embodiments. In this embodiment, the flange plate 6 that is mounted to the inner component 2 has guide rails 15 for guiding the inner component 2, when moving to the activated state A. The provision of guide rail 15 is, however, not necessarily required to realize accurate guidance during telescoping movement between the inner and outer components 2 when moving from the idle state R to the activated state A.

Figure 7B:
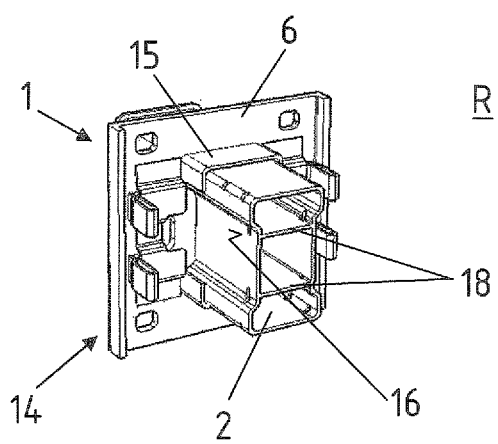
FIG. 7b is a detailed perspective front view of an inner component of the structural part with attached flange plate.

Placed against the flange plate 6 on its side distal to the guide rails 15 is the outer component 3. In the idle state R of the crash box 1, the locking element 17 of the mechanism 14 is engaged by the locking lug 19 which is not shown in FIG. 7a. FIG. 7b is a detailed perspective front view of the inner component 2 of the crash box 1 to show in greater detail the locking mechanism 14.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A structural part for a motor vehicle, comprising:
   an inner component having a generally rectangular cross section and configured in the form of a multichamber hollow section made of light metal;
   an outer component having a generally rectangular cross section, said inner and outer components movable in a telescoping manner relative to one another between an idle state and an activated state;
   a first locking mechanism for locking the idle state;
   a second locking mechanism comprising locking members for locking the activated state, wherein one of the locking members is directly arranged on the outer component and another one of the locking members is directly arranged on the inner component; and
   an actuator adapted to move the inner and outer components from the idle state to the activated state.

2. The structural part of claim 1, wherein the actuator is a mechanical, pyrotechnical, electromechanical, pneumatic and/or hydraulic actuating element.

3. The structural part of claim 1, wherein the actuator is a spring.

4. The structural part of claim 3, wherein the spring is a helical spring.

5. The structural part of claim 3, wherein the spring is maintained under tension in the idle state.

6. The structural part of claim 3, wherein the first locking mechanism includes a predetermined breaking point which ruptures in the event of a crash to release the spring and thereby move the inner and outer components from the idle state to the activated state.

7. The structural part of claim 1, wherein the actuator includes a recognition sensor system to activate the first locking mechanism and thereby release the locked idle state in the event of an imminent crash.

8. The structural part of claim 1, wherein the actuator is rendered operative by a recognition sensor system.

9. The structural part of claim 1, further comprising a guide arranged between the inner and outer components.

10. The structural part of claim 1, wherein the light metal is aluminum alloy.

11. The structural part of claim 1, wherein the outer component is made of light metal.

12. The structural part of claim 9, wherein the light metal is aluminum alloy.

13. The structural part of claim 1, constructed in the form of a crash box.

14. The structural part of claim 1, wherein said other locking member is constructed as a detent nose for latching engagement with said one locking member.

15. The structural part of claim 1, wherein said other locking member is constructed in the form of an abutment, and wherein said one locking member is constructed as a detent nose for engagement with the abutment.

16. The structural part of claim 1, wherein said other locking member is constructed as oblong hole and wherein said one locking member is constructed as detent nose for engagement in the oblong hole.

17. The structural part of claim 1, wherein said one locking member is configured as circumferential groove formed on an end of the inner component, and wherein said other locking member is configured as a bulge formed on an end of the outer component for engagement in the circumferential groove.

18. A structural part for a motor vehicle, comprising:
   an inner component having a generally rectangular cross section and configured in the form of a multichamber hollow section made of light metal;
   an outer component having a generally rectangular cross section, said inner and outer components movable in a telescoping manner relative to one another between an idle state and an activated state;
   a first locking mechanism for locking the idle state;
   a second locking mechanism comprising a locking member and a locking device for locking the activated state, wherein the locking device is arranged on the outer component and includes a plate-like locking element, and wherein the locking member is arranged directly on the inner component and is constructed as a locking lug for latching engagement with the plate-like locking element; and
   an actuator adapted to move the inner and outer components from the idle state to the activated state.

* * * * *